(12) United States Patent
Park (10) Patent No.: US 7,834,485 B2
(45) Date of Patent: Nov. 16, 2010

(54) CONTROLLING APPARATUS OF A POWER CONVERTER OF SINGLE-PHASE CURRENT FOR PHOTOVOLTAIC GENERATION SYSTEM

(75) Inventor: Min Won Park, Keung Nam (KR)

(73) Assignee: Chang Won National University Business Administration, Chang Won (KR)

( * ) Notice: Subject to any disclaimer, the term of this patent is extended or adjusted under 35 U.S.C. 154(b) by 358 days.

(21) Appl. No.: 12/090,153

(22) PCT Filed: Feb. 14, 2007

(86) PCT No.: PCT/KR2007/000772

§ 371 (c)(1),
(2), (4) Date: Apr. 14, 2008

(87) PCT Pub. No.: WO2008/013353

PCT Pub. Date: Jan. 31, 2008

(65) Prior Publication Data

US 2008/0278983 A1    Nov. 13, 2008

(30) Foreign Application Priority Data

Jul. 26, 2006    (KR) ...................... 10-2006-0070172

(51) Int. Cl.
*H01H 47/24* (2006.01)
(52) U.S. Cl. .................................. 307/117; 323/906
(58) Field of Classification Search .............. 323/906; 320/140; 136/291; 307/117, 151, 65
See application file for complete search history.

(56) References Cited

U.S. PATENT DOCUMENTS

| 4,494,180 | A  * | 1/1985 | Streater et al. ............. | 323/906 |
| 6,914,418 | B2 * | 7/2005 | Sung ........................... | 320/140 |

FOREIGN PATENT DOCUMENTS

| JP | 2001-75662    | 3/2001 |
| JP | 2006-39634    | 2/2006 |
| KR | 10-2004-0058151 | 7/2004 |

OTHER PUBLICATIONS

English language Abstract of JP 2001-75662.
English language Abstract of JP 2006-39634.
English language Abstract of KR 10-2004-0058151.

* cited by examiner

*Primary Examiner*—Shawn Riley
(74) *Attorney, Agent, or Firm*—Greenblum & Bernstein P.L.C.

(57) ABSTRACT

A control apparatus of a single-phase power converter for a photovoltaic power generation system is disclosed, including a POS MPPT controller for calculating a rating current by applying a POS MPPT control method to an output current detected through a current transformer of a single-phase AC filter, a bandpass filter for filtering only signals of a low-frequency band from a load, a single-phase reference current generator for producing a reference current by matching a phase of the current from the POS MPPT controller to a phase from the bandpass filter, a single-phase current subtractor for subtracting an output current of a current transformer from the reference current calculated by the single-phase reference current generator to thereby calculate a difference current between the output current of the current transformer and the reference current, a PI controller for outputting a control signal, corresponding to the difference current from the single-phase current subtractor, to a PWM signal generator, and the PWM signal generator for generating a PWM phase control signal corresponding to the control signal from the PI controller.

1 Claim, 8 Drawing Sheets

CONTROLLING APPARATUS OF A POWER CONVERTER OF SINGLE-PHASE CURRENT FOR PHOTOVOLTAIC GENERATION SYSTEM

TECHNICAL FIELD

The present invention relates to a control apparatus of a single-phase power converter for a photovoltaic power generation system, and more particularly, to a technique in which a system configuration can be simplified significantly as compared with the existing configuration, the miss ratio of tracking control can be minimized, and economic aspects for configuring a system can also be minimized through a method of eliminating feedback factors with respect to an output terminal of a solar cell by applying a photovoltaic output senseless (hereinafter, referred to as 'POS') maximum power point tracking (hereinafter, referred to as 'MPPT') control method to a single-phase power converter for a system association type photovoltaic power generation system.

BACKGROUND ART

In general, MPPT control methods of a photovoltaic power generation system can be largely classified into a power comparison control method and a constant voltage control method.

Figure 1:
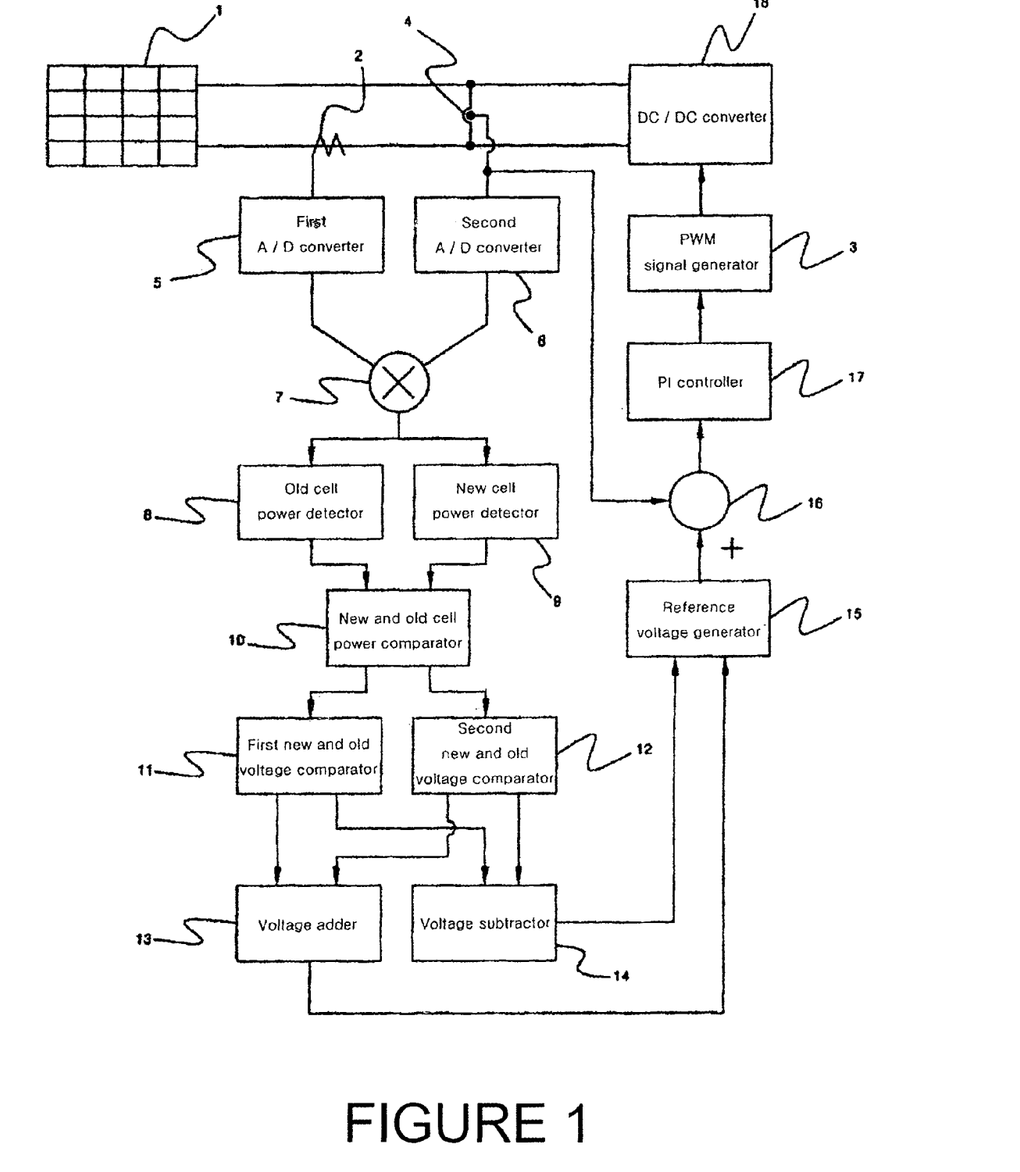
FIG. 1 is a block diagram of a power comparison apparatus of a conventional photovoltaic power generation system.
Figure 2:
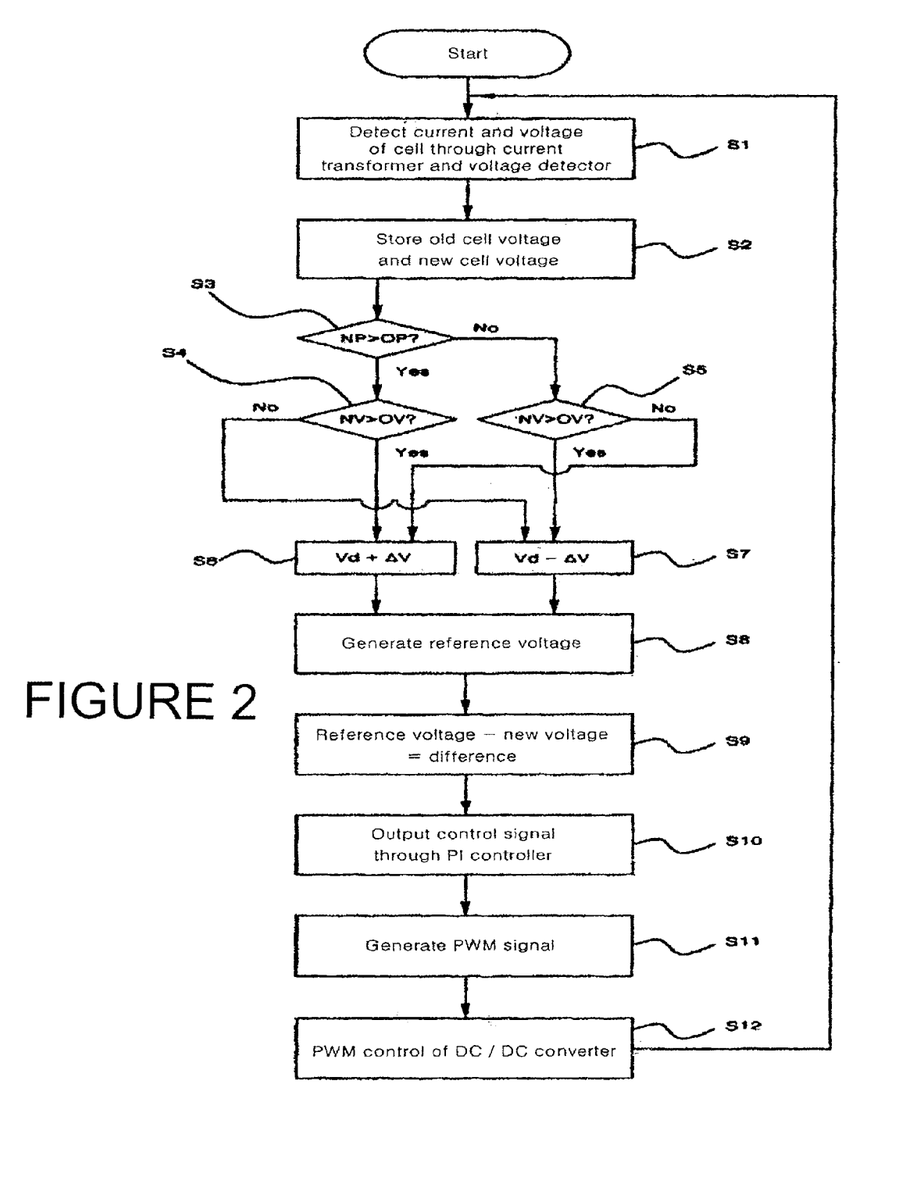
FIG. 2 is a flowchart illustrating a conventional power comparison control method.

In the power comparison control method of the MPPT control methods, as shown in FIGS. 1 and 2, current and voltage output, as analog signals, from a solar cell 1, which is formed of crystalline silicon (single crystal, polycrystal), amorphous silicon, compound semiconductor or the like and converts photovoltaic-motive force into electric energy are sampled and detected (S1) through a current transformer 2 and a voltage detector 4, respectively, in real-time. The detected analog signals are converted into digital signals through the first and second A/D converters 5, 6 and then output to a power calculator 7. Then, the power calculator 7 calculates electric power based on the current and voltage and stores the calculated result (S2).

Thereafter, an old power detector 8 and a new cell power detector 9 receive output signals of the power calculator 7, detect an old cell power OP and a new cell power NP, and transfer them to a new and old power comparator 10. The new and old power comparator 10 compares the old cell power OP and the new cell power NP to determine whether the new cell power NP is greater than the old cell power OP (S3).

If, as a result of the determination, the new cell power is greater than the old cell power (NP>OP; Yes in S3), the old cell power OP and the new cell power NP are transferred to a first new and old voltage comparator 11 for comparing a new cell voltage NV and an old cell voltage OV as they are. If it is determined that the new cell power NP is smaller than the old cell power OP (No in S3), the old cell power OP and the new cell power NP are transferred to a second new and old voltage comparator 12 for comparing a new cell voltage NV and an old cell voltage OV as they are.

Therefore, the first and second new and old voltage comparators 11, 12 compare the new cell voltage NV and the old cell voltage OV in their state (S4, S5), and output the comparison result values to a voltage adder 13 and a voltage subtractor 14, respectively, according to the result.

Thus, the voltage adder 13 adds (S6) a voltage variation ΔV to a voltage value Vd, which was measured and stored one sampling prior to a value that is currently input according to the output values of the first and second new and old voltage comparators 11, 12. For example, NP is greater than OP (Yes in S3) and NV is greater than OV (Yes in S4), the voltage variation ΔV is added to the voltage value Vd, which was measured and stored one sampling prior to a value that is currently input, and the resulting value is output to a reference voltage generator 15. If NP is smaller than OP (No in S3) and NV is smaller than OV (No in S5), the voltage variation ΔV is added to the voltage value Vd, which was measured and stored one sampling prior to a value that is currently input, and the resulting value is output to the reference voltage generator 15.

Further, the voltage subtractor 14 subtracts the voltage variation ΔV from the voltage value Vd, which was measured and stored one sampling prior to a currently input value, according to the output values of the first and second new and old voltage comparators 11, 12 (S7). For example, if the NP is greater than the OP (Yes in step S3) and the NV is smaller than the OV (No in step S4), the voltage subtractor 14 subtracts the voltage variation ΔV from the voltage value Vd, which was measured and stored one sampling prior to a currently input value, and outputs the resulting value to the reference voltage generator 15. If the NP is smaller than the OP (No in step S3) and the NV is greater than the OV (Yes in step S5), the voltage subtractor 14 subtracts the voltage variation ΔV from the voltage value Vd, which was measured and stored one sampling prior to a currently input value, and outputs the resulting value to the reference voltage generator 15.

The reference voltage generator 15 generates a new reference voltage based on the voltages output from the voltage adder 13 and the voltage subtractor 14 (S8). A subtractor 16 receives the reference voltage from the reference voltage generator 15, subtracts an output voltage of the solar battery cell 1, which is output to the voltage detector 15, from the reference voltage, to calculate an error value (S9), and outputs the error value to a PI controller 17.

The PI controller 17 outputs a control signal, corresponding to the error value, to a PWM signal generator 3 (S10). A pulse width of the control signal, output from the PWM signal generator 3, is converted accordingly in real-time and then output to a DC/DC converter 18 (S11). Thus, a maximum output point can be tracked in response to variation in voltage and current of the solar battery cell 1 in which a DC voltage, output from the DC/DC converter 18 for supplying voltage from the solar battery cell 1 to each load, varies every moment. The tracked maximum output point can be supplied in real-time (S12).

Figure 3:
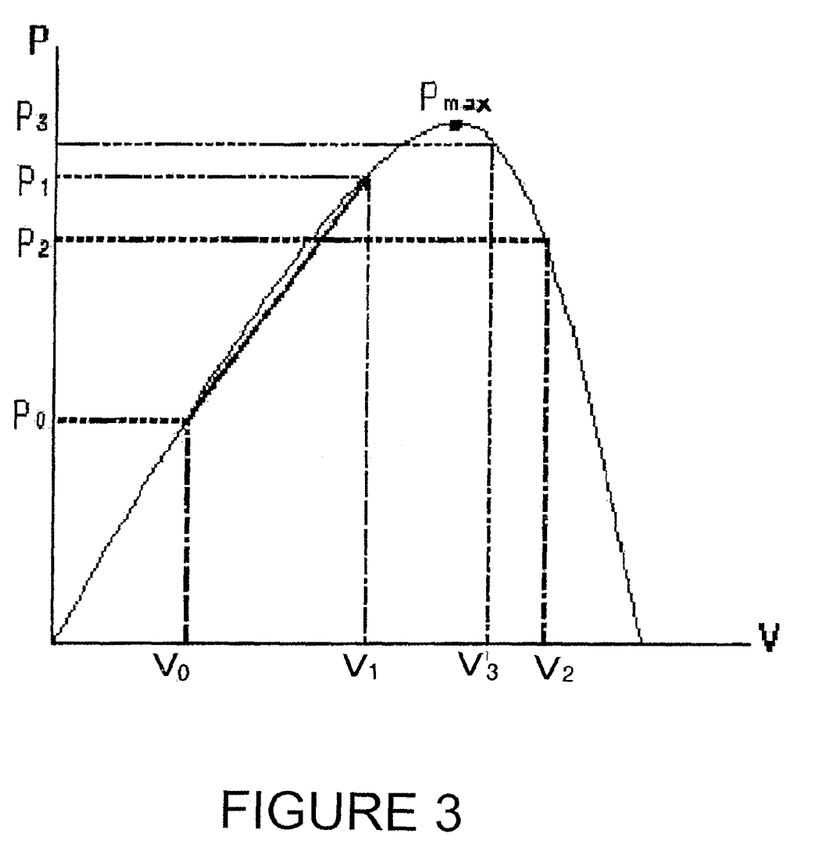
FIG. 3 shows a power-voltage characteristic curve of a solar cell.

Meanwhile, FIG. 3 shows a power-voltage characteristic curve of a solar battery cell. Assuming that a point where MPPT control begins is $0$ $(P_0, V_0)$, a point 1 is $P_1, V_1$, a point 2 is $P_2, V_2$, and a point 3 is $P_3, V_3$, V is increased (+) and P is also increased (+) at the point $0$ in order to track the maximum power. In case of a course 1 from the point $0$ to the point 1 and then a course 2 from the point 1 to the point 2, V is increased (+), but P is decreased (−). Thus, the voltage variation ΔV has to be decreased (−) in order to track the maximum power.

Further, if the course 2 changes to a course 3 from the point 2 to the point 3, V is decreased (−), but P is increased (+). However, for maximum value tracking, the voltage variation ΔV must be decreased (−). After the course 3 (an opposite side after the maximum point), V is decreased (−) and P is also decreased (−). Thus, the voltage variation ΔV must be increased (+) (a course 4). (where a control factor is voltage V and power P=current I)

An algorithm with respect to the conventional MPPT control method as described above can be expressed in the following table 1.

TABLE 1

| Course | V | P | ΔV |
|---|---|---|---|
| 0→1 | + | + | + |
| 1→2 | + | − | − |
| 2→3 | − | + | − |
| 3→4 | − | − | + |

In this case, all the remaining constituent elements other than the current transformer 2, the voltage detector 4 and the DC/DC converter 18 can be embedded in one processor, although they are separately shown in the drawing.

However, the power comparison control method described above is adapted to operate at the maximum output point based on an output power and voltage of the solar battery cell. Thus, two sensors, that is, a current transformer and a voltage detector are required at the output terminal of the solar battery cell. Further, two A/D converters are also required at the processor in order to calculate a current and voltage, input as an analog signal from the current transformer and the voltage detector, based on the algorithm as shown in FIG. 2. In addition, a calculation process is also relatively complicated since such calculation is performed based on two inputs.

In other words, the power comparison control method of the conventional MPPT control method is of a type in which an increase and decrease are compared between an output voltage and current of the solar battery cell and a feedback power and voltage thereof in order to track a maximum output always. This control method has a complicated control algorithm and is problematic in that there is a significant danger of tracking control failure.

Meanwhile, the constant voltage control method has a simplified control algorithm since only an output voltage of the solar battery cell is feedbacked. Thus, a danger of tracking control failure can be minimized and control stability can be maximized. However, an optimal output cannot be always output because an output voltage of the solar battery cell is fixed.

Thus, it is a fact that the conventional MPPT control method has a specific shortcoming in each control method.

Accordingly, in the prior art, the senseless MPPT control apparatus of the photovoltaic power generation system and a method thereof in which only current flowing into the load is feed back and the maximum output point of the solar cell is tracked in order to always produce an optimal output, the configuration of the control circuit can be more simplified by reducing the number of a feedback element to one, and the failure of tracking control can be minimized were used.

Figure 4:
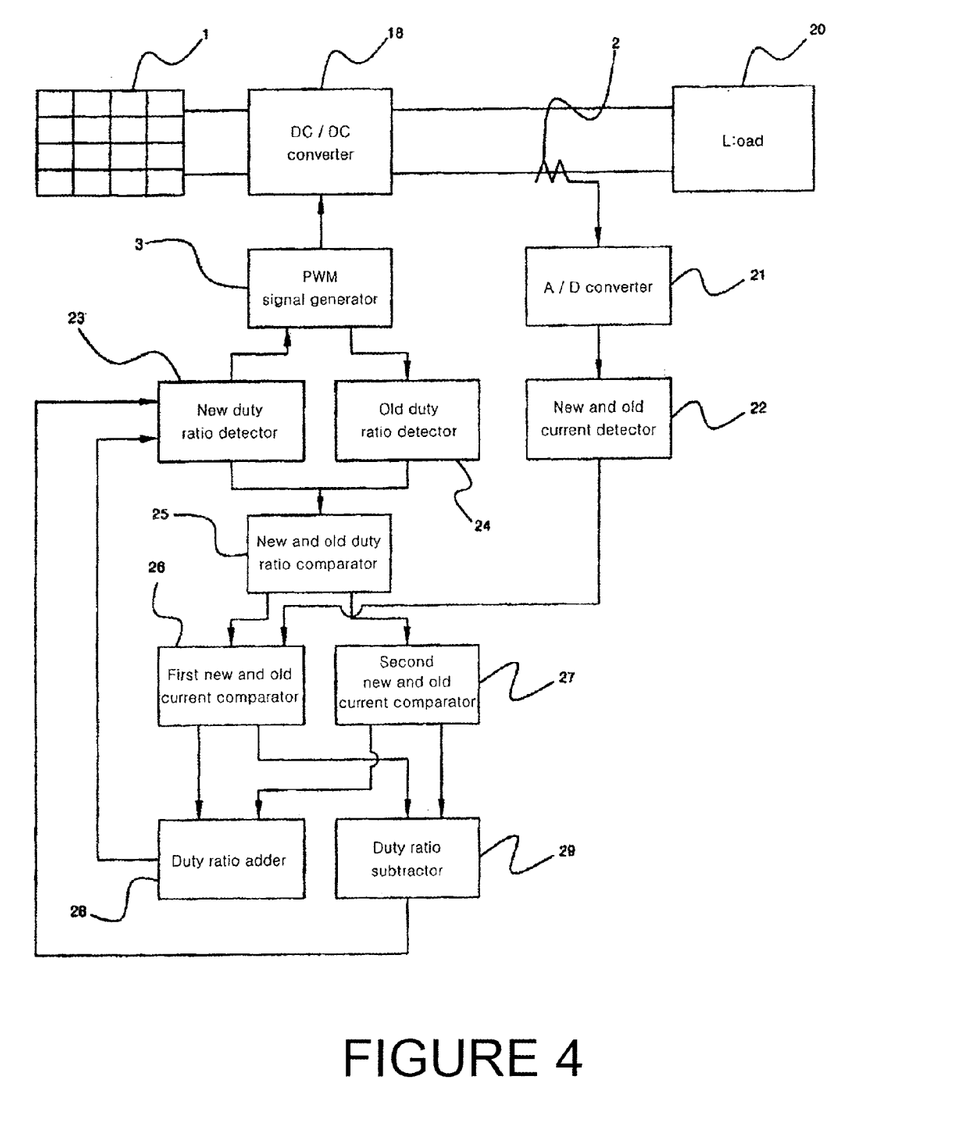
FIG. 4 is a block diagram of a senseless MPPT control apparatus of a conventional photovoltaic power generation system.

The senseless MPPT control apparatus of the photovoltaic power generation system includes, as shown in FIG. 4, a current transformer 2 for detecting an output current of a DC/DC converter 18, which DC/DC-converts an output voltage of a solar battery cell 1 and inputs a converted voltage to a load 20; an A/D converter 21 for converts a load current, output as an analog signal from the current transformer 2, into a digital signal; a new and old current detector 22 for detecting a new current NC and an old current OC, respectively, which are introduced to the load 20, from current values output from the A/D converter 21; a new duty ratio detector 23 for detecting a new duty ratio ND from output signals of a duty ratio adder 28 and a duty ratio subtractor 29 and storing the detected duty ratio; an old duty ratio detector 24 for detecting an old duty ratio OD from an output signal of a PWM signal generator 3 and storing the detected duty ratio; a new and old duty ratio comparator 25 for comparing the output signal of the new duty ratio detector 23 and the output signal of the old duty ratio detector 24; first and second new and old current comparators 26, 27 for receiving a comparison result value of the new and old duty ratio comparator 25 and the new current NC and the old current OC of the new and old current detector 22, comparing the new current NC and the old current OC when the new duty ratio ND is greater than the old duty ratio OD (ND>OD) or the new duty ratio ND is smaller than the old duty ratio OD (ND<OD), and outputting output values corresponding to the comparison results to the duty ratio adder 28 and the duty ratio subtractor 29, respectively; the duty ratio adder 28 for adding a duty ratio variation ΔD to the new duty ratio ND to produce a new duty ratio, if predetermined output signals are respectively input from the first and second new and old current comparators 26, 27; the duty ratio subtractor 29 for subtracting the duty ratio variation ΔD from the new duty ratio ND to produce a new duty ratio, if pre-determined output signals are respectively input from the first and second new and old current comparators 26, 27; and the PWM signal generator 3 for, if the new duty ratio ND, which has been increased or decreased according to the new duty ratios output from the duty ratio adder 28 and the duty ratio subtractor 29, is input through the new duty ratio detector 23, modulating (PWM) a pulse width of a control signal according to the duty ratio, and outputting the result to the old duty ratio detector 24 or the DC/DC converter 18.

Figure 5:
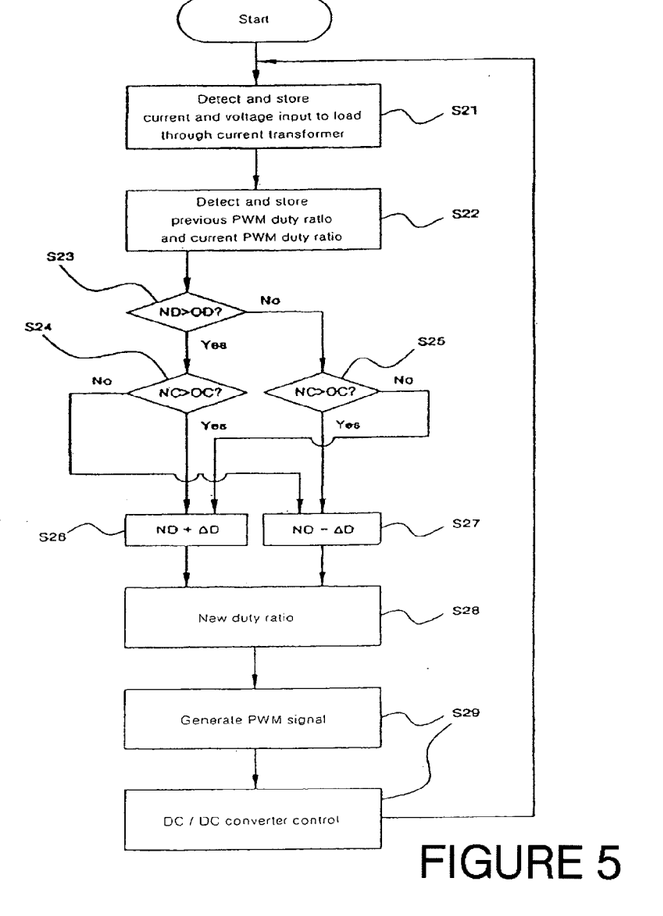
FIG. 5 is a flowchart illustrating a senseless MPPT control method of a conventional photovoltaic power generation system.

Further, the senseless MPPT control method of the photovoltaic power generation system of the present invention includes, as shown in FIG. 5, a step (S21) of allowing the new and old current detector 22, connected to the current transformer 2, to detect a current introduced to the load 20, and to store the detected current; a step (S22) of allowing the new and old duty ratio detectors 23, 24 to detect a PWM duty ratio that was used previously and a PWM duty ratio that is currently being used and to store the detected PWM duty ratios; a step (S23) of determining whether the new duty ratio ND is greater than the old duty ratio OD; a step (S24, S25) of, if as a result of the comparison, the new duty ratio ND is greater than the old duty ratio OD (Yes in step S23) or the new duty ratio ND is smaller than the old duty ratio OD (No in step S23), determining whether a new current NC is greater than an old current OC; steps (S26, S28) of, if, as a result of the comparison, the new duty ratio is greater than the old duty ratio (ND>OD) and the new current is greater than the old current (NC>OC) or the new duty ratio is smaller than the old duty ratio (ND<OD) and the new current is smaller than the old current (NC<OC), adding a duty ratio variation ratio ΔD to the new duty ratio ND (ND+ΔD) to produce a new duty ratio; a step (S27, S28) of, if, as a result of the comparison, the new duty ratio is greater than the old duty ratio (ND>OD) and the new current is smaller than the old current (NC<OC) or the new duty ratio is smaller than the old duty ratio (ND<OD) and the new current is greater than the old current (NC>OC), subtracting the duty ratio variation ratio ΔD from the new duty ratio ND (ND+ΔD) to produce a new duty ratio; and a step (S29) of allowing the PWM signal generator 3 to generate a PWM signal corresponding to the new duty ratio and to control the DC/DC converter 18.

In the senseless MPPT control apparatus of the conventional photovoltaic power generation system constructed as above and having the above steps and the method thereof, the new and old current detector 22 detects and stores a current of the load 20, which is detected through one current transformer 2 (S21). The new and old duty ratio detectors 23, 24 detect and store a PWM duty ratio OD that was used previously and a PWM duty ratio ND that is currently being used, respectively (S22).

The new and old duty ratio comparator 25 receives the output signals of the new duty ratio detector 23 and the old duty ratio detector 24, respectively, determines whether the new duty ratio ND is greater than the old duty ratio OD (S23), and transfers the comparison results to the first and second new and old and current comparators 26, 27.

That is, the new and old duty ratio comparator 25 determines whether the new duty ratio ND is greater than the old duty ratio OD (S23). If, as a result of the determination, the new duty ratio ND is greater than the old duty ratio OD (Yes in step S23), the new and old duty ratio comparator 25 transfers the comparison result to the first new and old current comparator 26. If, as a result of the determination, the new duty ratio ND is smaller than the old duty ratio OD (No in step S23), the new and old duty ratio comparator 25 transfers the comparison result to the second new and old current comparator 27.

If the comparison result of the new duty ratio ND and the old duty ratio OD is input from the new and old duty ratio comparator 25, the first and second new and old current comparators 26, 27 receive the new current NC and the old current OC stored in the new and old current detector 22, respectively, compare the new current NC and the old current OC when the new duty ratio ND is greater than the old duty ratio OD (ND>OD) and the new duty ratio ND is smaller than the old duty ratio OD (ND<OD), and output output values, corresponding to the comparison results, to the duty ratio adder 28 and the duty ratio subtractor 29, respectively.

In other words, in the state where the new duty ratio ND is greater than the old duty ratio OD (Yes in step S23), if the new current NC is greater than the old current OC (Yes in step S24) as a result of the comparison result (S24) of the new current NC and the old current OC in the first new and old current comparator 26, the first new and old current comparator 26 transfers the result to the duty ratio adder 28. If the new current NC is smaller than the old current OC (No in step S24), the first new and old current comparator 26 transfers the result to the duty ratio subtractor 29.

Furthermore, if, as a result of comparing (S25) the new current NC and the old current OC in the second new and old current comparator 27, the new current NC is greater than the old current OC (Yes in step S25) in the state where the new duty ratio ND is smaller than the old duty ratio OD (No in step S23), the second new and old current comparator 27 transfers the result to the duty ratio subtractor 29. If, as a result of the comparison, the new current NC is smaller than the old current OC (Yes in step S25), the second new and old current comparator 27 transfers the result to the duty ratio adder 28.

As described above, if, as a result of the comparison in the first new and old current comparator 26, since the new duty ratio ND is greater than the old duty ratio OD (ND>OD) and the new current NC is greater than the old current OC (NC>OC) or the new duty ratio ND is smaller than the old duty ratio OD (ND<OD) and the new current NC is smaller than the old current OC (NC<OC), the result is transferred from the first new and old current comparator 26 to the duty ratio adder 28, the duty ratio adder 28 adds a predetermined duty ratio variation ratio ΔD to the new duty ratio ND (ND+?D) (S26) to produce a new duty ratio (S28), and transfers a new duty ratio to the PWM signal generator 3 through the new duty ratio detector 23.

On the other hand, if, as a result of the comparison in the second new and old current comparator 27, since the new duty ratio ND is greater than the old duty ratio OD (ND>OD) and the new current NC is smaller than the old current OC (NC<OC) or the new duty ratio ND is smaller than the old duty ratio OD (ND<OD) and the new current NC is greater than the old current OC (NC>OC), the result is transferred from the second new and old current comparator 27 to the duty ratio subtractor 29, the duty ratio subtractor 29 subtracts a predetermined duty ratio variation ratio ΔD from the new duty ratio ND (ND–ΔD) (S27) to produce a new duty ratio (S28), and transfers a new duty ratio to the PWM signal generator 3 through the new duty ratio detector 23.

The PWM signal generator 3 generates a PWM signal corresponding to the new duty ratio output from the duty ratio adder 28 or the duty ratio subtractor 29, and controls the DC/DC converter 18 (S29).

As described above, the output voltage from the solar battery cell 1 increases or decreases according to the feedback of the current input to the load 20. In this case, it can be seen that a voltage at the input terminal of the DC/DC converter 18 increases or decreases depending on an increase or decrease of the duty ratio according to the control signal of the DC/DC converter 18.

In other words, if an on-time of the PWM signal output from the PWM signal generator 3 is great, the voltage at the input terminal of the DC/DC converter 18 decreases and an introduced current increases. If on-time of the PWM signal output from the PWM signal generator 3 is small, the voltage at the input terminal of the DC/DC converter 18 increases and an introduced current decreases. Accordingly, the output voltage of the solar battery cell 1, which is output through the DC/DC converter 18 under the control of the PWM signal generator 3, can be supplied to the load 20 as an always optimal state.

It can also be said that the relationship between the current I and the voltage P output from the solar battery cell 1 is in inverse proportion to each other as in the V-I characteristic curve of the solar battery cell. For example, the greater the on-time of the DC/DC converter 18 becomes, the more the current becomes and the smaller the voltage becomes.

In other words, it can be seen that if the duty ratio increases (switching is many), the voltage decreases, and if the duty ratio decreases (switching is small), the voltage increases.

In this case, the duty ratio is controlled by the PWM signal generator 3. If an increment and decrement of the duty ratio are known to the PWM signal generator 3, it is not necessary to separately feedback an increment and decrement (+, –) of the voltage (V) component.

The input current I of the load 20 is proportional to the output power P of the solar battery cell 1. Thus, it can be seen that the current I is the same as the P component of the conventional MPPT as in a table 2.

TABLE 2

| Algorithm of PV output senseless control method | | | | | |
|---|---|---|---|---|---|
| Course | Duty Ratio | V | I = (p) | ΔD | ΔV |
| 1 (V$_0$ → V$_1$) | – | + | +(+) | – | + |
| 2 (V$_1$ → V$_2$) | – | + | –(–) | + | – |
| 3 (V$_2$ → V$_3$) | + | – | +(+) | – | – |
| 4 (V$_3$ → V$_4$) | + | – | –(–) | + | + |

Figure 6:
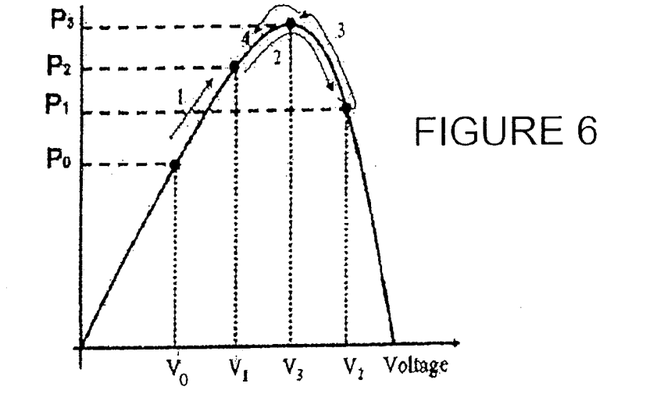
FIG. 6 shows a power-voltage characteristic curve of a senseless MPPT control apparatus of a photovoltaic power generation system.

FIG. 6 shows a power-voltage characteristic curve according to the present invention. Referring to FIG. 6, P=I, V=duty ratio, ΔV=Δduty ratio, where the duty ratio is controlled by a PWM signal (this is true of an increase and decrease of ΔV). Thus, factors to be controlled include only the current I.

Accordingly, the senseless MPPT control apparatus of the conventional photovoltaic power generation system and the method thereof are simpler than the power comparison method of the conventional photovoltaic power generation system because there is no feedback of voltage as in the power comparison apparatus of the photo voltaic power generation system.

Figure 7:
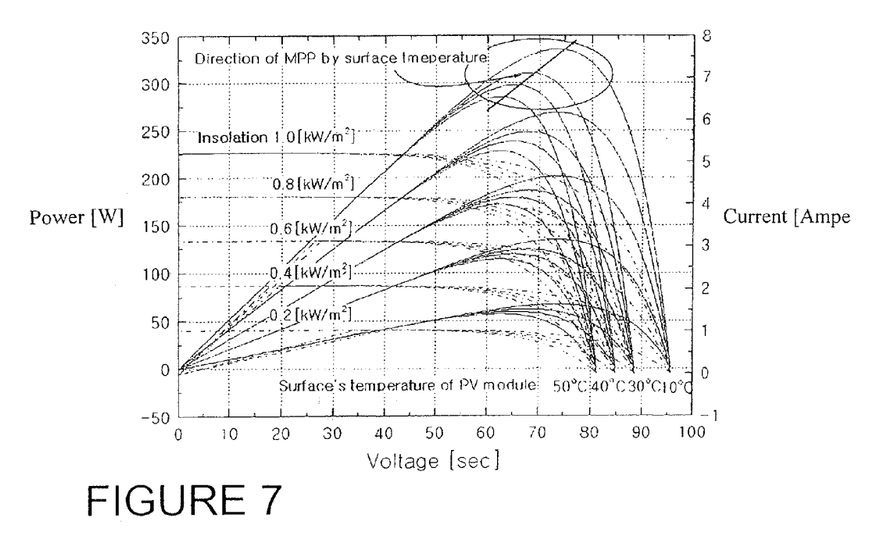
FIG. 7 shows a power-voltage and voltage-current characteristic curve of a PV array used in an experiment by employing the senseless MPPT control apparatus of the conventional photovoltaic power generation system.

As a result of an experiment carried out by applying the senseless MPPT control apparatus of the conventional photovoltaic power generation system and the method thereof to a PV-SPE system (it is considered as a load whose input power and current increase as the output of a solar cell increases), it had better output characteristics than those of the conventional MPPT control method by the power comparison apparatus of the photovoltaic power generation system as shown in power-voltage and voltage-current characteristic curves of the PV array shown in FIG. 7.

However, in the control apparatus of the system association type photovoltaic power generation system by the power comparison apparatus of the conventional photovoltaic power generation system and the senseless MPPT control apparatus of the photovoltaic power generation system and the method thereof, current of a load and voltage of a system must be feed back while receiving voltage and current of an output terminal of a solar cell. Thus, the construction of the system becomes complicated and there is a high possibility of control failure.

Meanwhile, the photovoltaic power generation system can be largely classified into a direct connection method and an indirect connection method employing a power converter. The indirect connection method also needs to be further classified depending on the type of the power converter.

Output characteristics of a solar cell are greatly influenced by weather conditions such as the amount of sunshine and temperature. For this reason, the direct connection method has poor output efficiency and is rarely used, and the indirect connection method is usually used. To this end, maximum output tracking through the control apparatus construction of a power converter is necessarily required.

Further, electric energy output from solar cells are DC, whereas most loads are AC loads and a system uses a 60 Hz 220V AC system. Thus, a DC/AC converter is indispensable in order to commercialize solar cells.

The DC and AC converter of this photovoltaic power generation system includes a DC/DC converter, a single-phase (1Ø) DC/AC converter, and a three-phase (3Ø) DC/AC converter. Control algorithms of respective power converters are also different from each other.

An overall control system of each power converter of the photovoltaic power generation system must be also differently configured.

Figure 8:
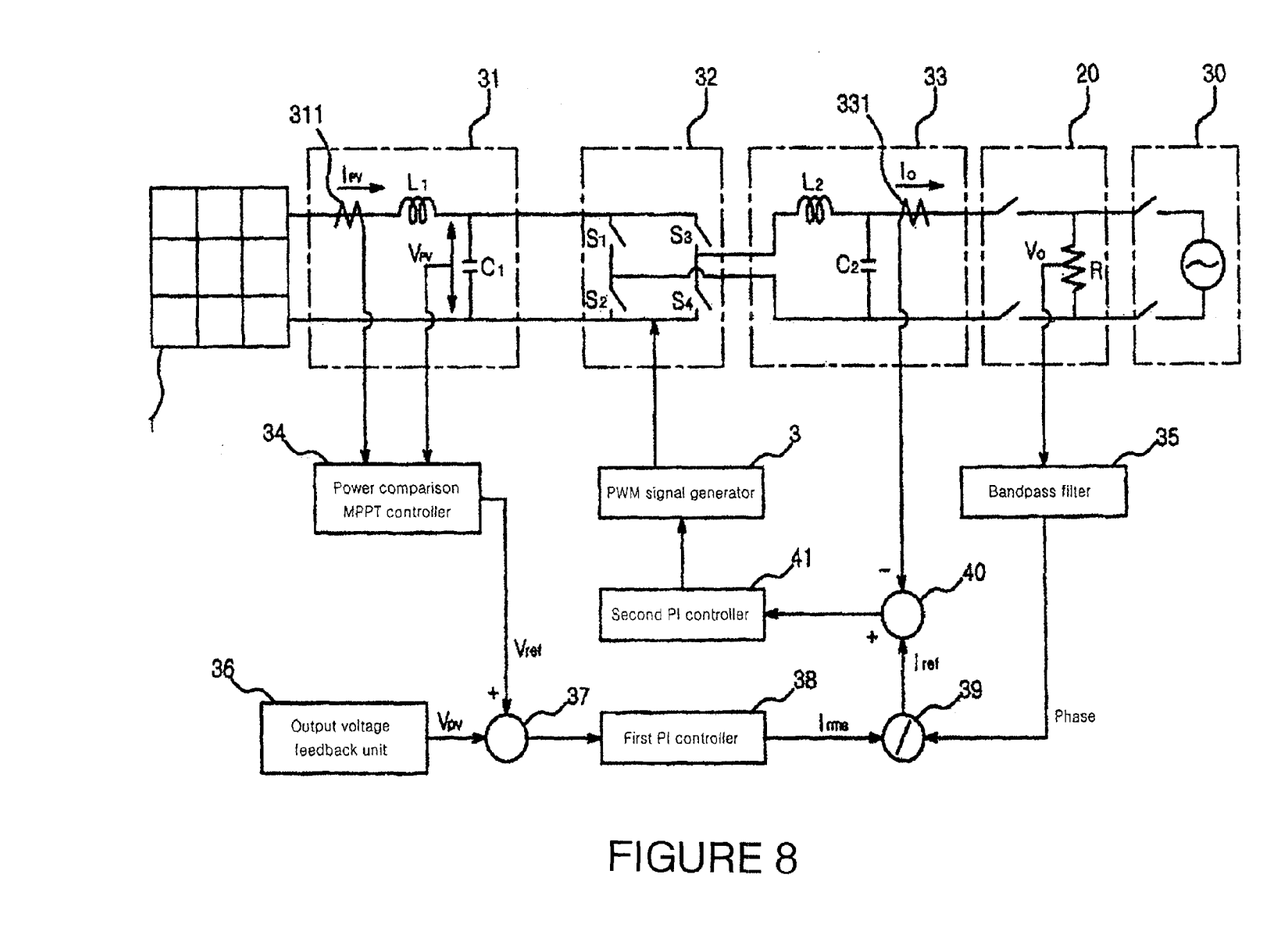
FIG. 8 shows a construction of a control apparatus of a single-phase power converter to which the conventional power comparison MPPT control method is applied.

However, the control apparatus of the single-phase power converter employing the conventional power comparison MPPT control method includes, as shown in FIG. 8, a DC filter 31 including a coil L1 and a condenser C1 and configured to filter a noise signal, included in a DC voltage output from a solar cell 1, detect an output current Ipv of the solar cell 1 through a first current transformer 311 disposed at a front end portion of the coil L1, detect a voltage Vvp across the condenser C1, and transfer the voltage Vvp to a power comparison MPPT controller 34; a single-phase DC/AC converter 32 having several switches S1 to S4 connected in series and in parallel to one another and configured to convert a DC output voltage of the solar cell 1, which is output through the DC filter 31, into a constant AC voltage under phase control of a PWM signal generator 3; a single-phase AC filter 33 including a coil L2 and a condenser C2 and configured to filter a noise signal, included in the AC voltage output through the single-phase DC/AC converter 32, detect a current Io flowing through a load 20 and a utility 30 through a second current transformer 331 disposed at a rear end portion of the coil L2 and the condenser C2, and transfer a detected current to a single-phase current subtractor 40; a bandpass filter 35 for having only low-frequency bands from the load 20 pass therethrough; an output voltage feedback unit 36 for feeding back an output voltage Vpv of the solar cell 1; the power comparison MPPT controller 34 for calculating a reference voltage Vref based on the output current Ipv and the voltage Vpv of the solar cell 1, which are detected and output through the DC filter 31; a voltage subtractor 37 for detecting a difference voltage by subtracting the feedback voltage Vpv, which is detected by the output voltage feedback unit 36, from the reference voltage Vref output from the power comparison MPPT controller 34; a first PI controller 38 for detecting a rating current Irms corresponding to the difference voltage (Vref−Vpv) detected by the voltage subtractor 37 and transferring the rating current Irms to a single-phase reference current generator 39; the single-phase reference current generator 39 for producing a reference current Iref by matching a phase of the rating current Irms output from the first PI controller 38 to a phase provided from the bandpass filter 35; the single-phase current subtractor 40 for calculating a different current by subtracting an output current Io, detected by the second current transformer 331, from the reference current Iref produced from the single-phase reference current generator 39; a second PI controller 41 for outputting a control signal, corresponding to the difference current (Iref−Io) output from the single-phase current subtractor 40, to the PWM signal generator 3; and the PWM signal generator 3 for generating a PWM phase control signal corresponding to the control signal output from the second PI controller 41, tracking a maximum output point in accordance with a variation of a voltage and current of the solar cell 1 in which an AC voltage output from the single-phase DC/AC converter 32 is changed every moment, and outputting a maximum output point in real-time.

In this construction, however, an output voltage and current supplied to a load are feed back while detecting an output voltage and current of a solar cell. In other words, PWM phase control on the single-phase DC/AC converter is performed by feeding back the current of the load and the voltage of the system while both the voltage and current of an output terminal with respect to the solar cell are feed back. Accordingly, there are problems in that the construction of the system becomes complicated, the installation cost of the system is high, and the tracking miss ratio according to PWM phase control is also very high.

DISCLOSURE OF INVENTION

Technical Problem

Accordingly, the present invention has been made in view of the above problems occurring in the prior art, and an object of the present invention is to provide a control apparatus of a single-phase power converter for a photovoltaic power generation system, which can minimize the miss ratio of tracking control and significantly reduce the installation cost through a very simple construction by applying the POS MPPT control method to the single-phase power converter for the system association type photovoltaic power generation system in order to obviate feedback factors with respect to an output terminal of a solar cell.

Technical Solution

To achieve the above object, in constructing a control apparatus of a single-phase power converter for a photovoltaic power generation system including a solar cell, a DC filter, a single-phase DC/AC converter, and a single-phase AC filter and configured to convert a DC voltage, output from the solar cell, into an AC voltage and supply the AC voltage to a load and a utility, the apparatus of the present invention includes a POS MPPT controller for calculating a rating current Irms by applying a POS MPPT control method to an output current, which is detected through a current transformer installed in the single-phase AC filter; a bandpass filter for filtering only signals of a low-frequency band from the load; a single-phase reference current generator for producing a reference current Iref by matching a phase of the current output from the POS MPPT controller to a phase output from the bandpass filter; a single-phase current subtractor for subtracting an output current Io, detected by the current transformer, from the reference current Iref produced from the single-phase reference current generator to thereby calculate a difference current between the output current Io and the reference current Iref; a PI controller for generating a control signal corresponding to the difference current, output from the single-phase current subtractor; and a PWM signal generator for receiving the control signal from the PI controller and generating a PWM phase control signal in response to the control signal. A maximum output point of an AC voltage output from the single-phase DC/AC converter is tracked according to a variation of a voltage and current of the solar cell, which are changed every moment, and output in real-time.

Advantageous Effects

As described above, in accordance with the present invention, the POS MPPT control method is applied to the single-phase power converter for the system association type photovoltaic power generation system in order to obviate feedback factors with respect to an output terminal of a solar cell. Accordingly, the miss ratio of tracking control can be minimized and the installation cost can be reduced significantly through a very simple construction.

DESCRIPTION OF REFERENCE NUMERALS OF PRINCIPAL ELEMENTS IN THE DRAWINGS

1: solar cell 3: PWM signal generator
20: load 30: utility
31: DC filter 32: single-phase DC/AC converter
33: single-phase AC filter
42: POS MPPT controller 35: bandpass filter
43: single-phase reference current generator
44: single-phase current subtractor 45: PI controller
331: current transformer

BEST MODE FOR CARRYING OUT THE INVENTION

The present invention will now be described in detail in connection with a specific embodiment with reference to the accompanying drawings.

Figure 9:
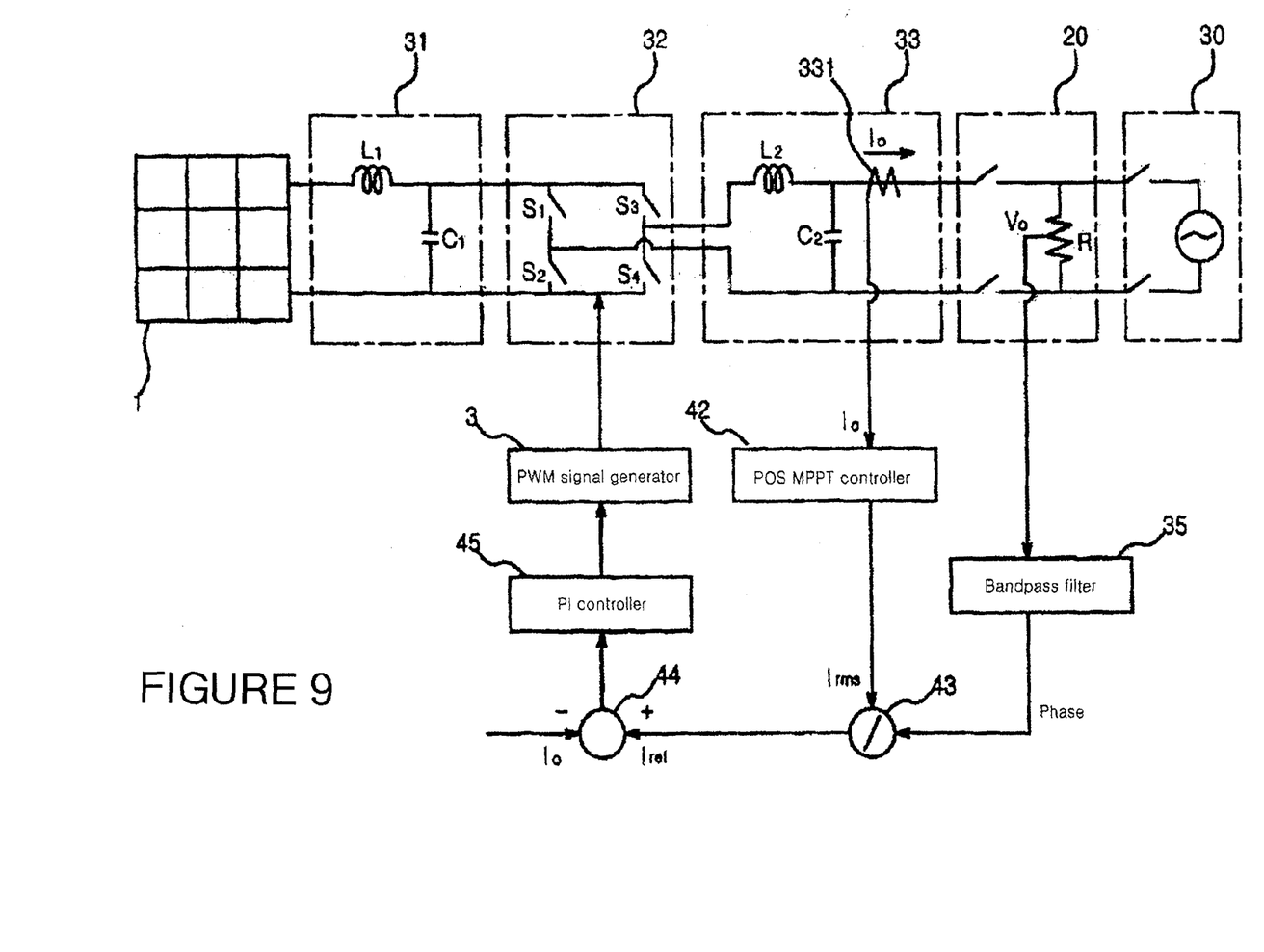
FIG. 9 shows a construction of an apparatus according to the present invention.

FIG. 9 shows a construction of an apparatus according to the present invention.

Referring to FIG. 9, in constructing a control apparatus of a single-phase power converter for a photovoltaic power generation system including a solar cell 1, a DC filter 31, a single-phase DC/AC converter, 32 and a single-phase AC filter 33 and configured to convert a DC voltage, output from the solar cell 1, into an AC voltage and supply the AC voltage to a load 20 and a utility 30, the control apparatus of the present invention includes a POS MPPT controller 42 for calculating a rating current Irms by applying a POS MPPT control method to an output current, which is detected through a current transformer 331 installed in the single-phase AC filter 33;

a bandpass filter 35 for filtering only signals of a low-frequency band from the load 20;

a single-phase reference current generator 43 for producing a reference current Iref by matching a phase of the rating current Irms output from the POS MPPT controller 42 to a phase output from the bandpass filter 35;

a single-phase current subtractor 44 for calculating a difference current by subtracting an output current Io, detected by the current transformer 331, from the reference current Iref produced from the single-phase reference current generator 43;

a PI controller 45 for outputting a control signal corresponding to the difference current Iref Io, output from the single-phase current subtractor 44, to a PWM signal generator 3; and the PWM signal generator 3 for generating a PWM phase control signal, corresponding to the control signal output from the PI controller 45, to the single-phase DC/AC converter 32, and enabling the single-phase DC/AC converter 32 to track a maximum output point according to a variation of a voltage and current of the solar cell 1, which are changed every moment, through adequate on/off control of switches S1 to S4 and to output the maximum output point in real-time.

The operational effects of the apparatus constructed above according to the present invention are described below.

The apparatus of the present invention includes the solar cell 1, the DC filter 31, the single-phase DC/AC converter 32, the single-phase AC filter 33, the POS MPPT controller 42, the bandpass filter 35, the single-phase reference current generator 43, the single-phase current subtractor 44, the PI controller 45, and the PWM signal generator 3 as major technical constituent elements.

The POS MPPT controller 42 calculates the rating current Irms by applying the POS MPPT control method to the output current Io, which is detected through the current transformer 331 disposed in the single-phase AC filter 33 having a coil L2 and a condenser C2 and configured to filter noise signals included in an AC voltage output through the single-phase DC/AC converter 32 and supply the voltage to the load 20 and the utility 30.

The bandpass filter 35 extracts only a signal of a low-frequency band from the voltage, which is supplied to the load 20 through the single-phase AC filter 33, and transfers the signal to the single-phase reference current generator 43 as a phase control signal. The single-phase reference current generator 43 matches a phase of the signal, output from the bandpass filter 35, to a phase of the rating current Irms output from the POS MPPT controller 42, producing the reference current Iref.

Meanwhile, the single-phase current subtractor 44 calculates a difference current by subtracting the output current Io, detected by the current transformer 331 disposed in the single-phase AC filter 33, from the reference current Iref output from the single-phase reference current generator 43. The PI controller 45 outputs a control signal, corresponding to the difference current Iref Io output from the single-phase current subtractor 44, to the PWM signal generator 3.

MODE FOR THE INVENTION

The PWM signal generator 3 receives the control signal from the PI controller 45, and generates a PWM control signal, corresponding to a value and phase difference, to the single-phase DC/AC converter 32 so that switches S1 to S4 are turned on/off. Thus, the switches S1 to S4 of the single-phase DC/AC converter 32 are turned on/off automatically in response to the PWM control signal output from the PWM signal generator 3 according to a variation of a voltage and current of the solar cell 1, which are changed every moment, so that a maximum output point can be tracked and output in real-time.

In other words, when on-time of the PWM control signal output from the PWM signal generator 3 is great, a voltage at an input terminal of the single-phase DC/AC converter 32 decreases and a current input thereto increases. However, when on-time of the PWM control signal output from the PWM signal generator 3 is small, a voltage at an input terminal of the single-phase DC/AC converter 32 increases and a current input thereto decreases. Accordingly, an output voltage of the solar cell 1, which is output through the single-phase DC/AC converter 32 controlled by the PWM signal generator 3, can always become optimal and then supplied to the load 20.

Meanwhile, it can be considered that the current I and the voltage P, output from the solar cell 1, are in an inverse proportion relationship as in the V-I characteristic curve of the solar cell. For example, when on-time with respect to the switches S1 to S4 of the single-phase DC/AC converter 32 is great, a great amount of current flows and the voltage decreases.

As described above, in the single-phase power converter of the system association type photovoltaic power generation system of the present invention, the output of the solar cell can be kept to the maximum because the current Io of the load 20 is feed back through the POS MPPT control method.

Power input to the load 20 can be kept to the maximum while maximizing the output of the solar cell 1, by applying this method to the system association type photovoltaic power generation system. Further, energy efficiency can be maximized by supplying extra power to the system.

This principle is a kind of a current control voltage source inverter type power generation system in which power of the system consists of valid power and invalid power. The valid power P and the invalid power Q can be expressed as follows.

$$P = V_{rms} I_{rms} \cos \omega t$$

$$Q = V_{rms} I_{rms} \sin \omega t$$

In these equations, at the time of system association, the voltage Vrms of the load stage and the system are always fixed to 220V.

Thus, factors to be considered include only the load and the current Irms of the system.

That is, if only an optimal current is always supplied to the load and system, the maximum power is supplied to the load and system.

Accordingly, in the present invention, the output current Io detected through the current transformer 331 disposed in the single-phase AC filter 33 is feed back. The POS MPPT controller 42 calculates the rating current Irms calculated by the POS MPPT control method. The single-phase reference current generator 43 matches a phase of the feedback voltage of the system to the rating current Irms to decide the reference current Iref. The current Io value output from the single-phase AC filter 33 to the load and the reference current Iref are calculated through the single-phase current subtractor 44. The PWM output signal according to PI control in which a difference between the output current I0 value and an output Iref value is reduced is generated through the PI controller 45 and the PWM signal generator 3, so that switching time of the single-phase DC/AC converter 32 is controlled. Accordingly, the output voltage of the solar cell 1 can always be optimized and supplied to the load 20.

Meanwhile, assuming that the voltages of the load 20 and the system are phases, power P and Q produced by the apparatus of the present invention can be expressed as follows.

$$P = V_{rms} I_{ref} \cos \psi$$

$$Q = V_{rms} I_{ref} \sin \psi$$

Accordingly, when power input to the load and system is proportional to the reference current Iref and the output of the solar cell 1 becomes a maximum, the reference current Iref input to the load and system also become a maximum and the input power also becomes a maximum according to the above equations.

The greatest advantage of the control method employing the control apparatus is that there are no feedback factors for photovoltaic output control upon system association.

In other words, the control system of the system association type photovoltaic power generation system employing the existing power comparison MPPT control method has a complicated system construction and a high possibility of control failure because the current of the load and the voltage of the system must be feed back while receiving both voltage and current of the output terminal of the solar cell. However, In case of the system association type photovoltaic power generation system to which the POS MPPT control method employing the apparatus of the present invention is applied, there are no feedback factors at the output terminal of the solar cell. Accordingly, a system configuration can be simplified greatly compared the existing system, failure of tracking control can be minimized, and economic aspects for a system configuration can also be minimized.

Although the specific embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, according to the present invention, the POS MPPT control method is applied to the single-phase power converter for the system association type photovoltaic power generation system in order to obviate feedback factors with respect to an output terminal of a solar cell. Accordingly, the miss ratio of tracking control can be minimized and the installation cost can be reduced significantly through a very simple construction.

The invention claimed is:

1. A control apparatus of a single-phase power converter for a photovoltaic power generation system, which includes a solar cell, a DC filter, a single-phase DC/AC converter, and a single-phase AC filter and is configured to convert a DC voltage, output from the solar cell, into an AC voltage and supply the AC voltage to a load and a utility, the control apparatus comprises:

a POS MPPT controller for calculating a rating current Irms by applying a POS MPPT control method to an output current, which is detected through a current transformer installed in the single-phase AC filter;

a bandpass filter for filtering only signals of a low-frequency band from the load;

a single-phase reference current generator for producing a reference current Iref by matching a phase of the current output from the POS MPPT controller to a phase output from the bandpass filter;

a single-phase current subtractor for subtracting an output current Io, detected by the current transformer, from the reference current Iref produced from the single-phase reference current generator to thereby calculate a difference current between the output current Io and the reference current Iref;

a PI controller for generating a control signal corresponding to the difference current Iref−Io, output from the single-phase current subtractor; and a PWM signal generator for receiving the control signal from the PI controller and generating a PWM phase control signal in response to the control signal, wherein a maximum output point of an AC voltage output from the single-phase DC/AC converter is tracked according to a variation of voltage and current of the solar cell, which are changed every moment, and output in real-time.

\* \* \* \* \*